United States Patent Office 3,364,216
Patented Jan. 16, 1968

3,364,216
4,6-DIAMINO-s-TRIAZINYLETHYL PHOSPHINES AND PHOSPHINE OXIDES
Gerald Alvin Johnson, Austin, Tex., assignor to American Cyanamid Company, Stamford, Conn., a corporation of Maine
No Drawing. Continuation-in-part of application Ser. No. 424,219, Jan. 8, 1965. This application Oct. 18, 1965, Ser. No. 497,539
10 Claims. (Cl. 260—249.9)

ABSTRACT OF THE DISCLOSURE

Novel 4,6 - diamino-s-triazinylethyl phosphines and tris[2(4,6-diamino-s-triazinylethyl)]phosphine oxide of the formulae:

(I)
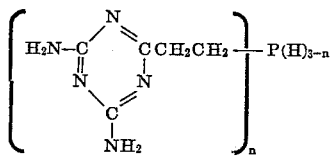

wherein $n$ is an integer from 1 to 3, inclusive, and (II)
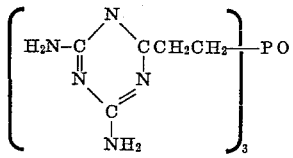

are provided as useful fire retardant agents.

---

This application is a continuation-in-part of copending application for Letters Patent, Ser. No. 424,219, filed Jan. 8, 1965, now abandoned.

The present invention relates to novel organophosphorus compounds, methylolated resinn thereof, and processes for preparing the same. More particularly, the invention relates to 4,6-diamino-s-triazinylethyl phosphines and tris[2(4,6-diamino-s-triazinylethyl)]phosphine oxide of the formulae:

(I)
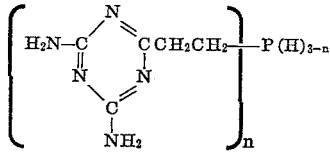

where $n$ is an integer from 1 to 3, inclusive, and (II)
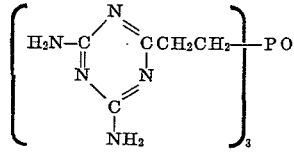

The phosphines of the present invention are useful as fire retardants in polyurethane foam compositions. Incorporating a suitable solution of the phosphines into a polyurethane foam results in markedly improved fire retardance of the resultant composition. Additionally, the phosphines may be resinified as by reaction with formaldehyde, to form useful coating and molding resins.

According to the process of the present invention, the products of Formula I, above, are prepared in a straight-forward manner by reacting dicyandiamide with a 2-cyanoethylphosphine of the formula $$(CNCH_2CH_2)_n—P(H)_{3-n}$$

where $n$ is as defined above. The reaction is carried out preferably in the presence of an alkali. Tris[2(4,6-diamino-s-triazinylethyl)]phosphine oxide (Formula II) is prepared in like manner with the exception that tris(2-cyanoethyl)phosphine oxide is substituted for a 2-cyanoethylphosphine.

It is an advantage of the present invention that the phosphines or phosphine oxides can be readily resinified by reaction of the latter with one or more moles of formaldehyde per mole of said phosphines or phosphine oxides to form enhanced resinous coating or molding materials. Although phosphine oxide-formaldehyde reaction products will be specifically illustrated, it is understood that any phosphine or phosphine oxide as hereinabove defined can be employed to form useful methylolated resins.

The following equation is typical of the reaction contemplated herein:

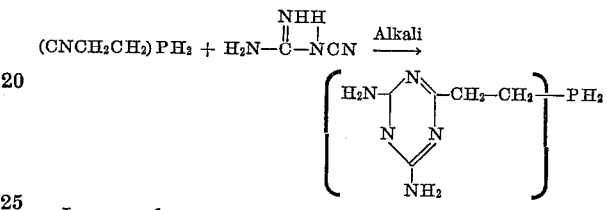

In general, any temperature between 0° C. and 175° C. can be used. The reactions of the present invention may be carried out at atmospheric, sub-atmospheric and super-atmospheric pressures. At high temperatures, say, from 100°–175° C., super-atmospheric pressures are generally employed. The process also lends itself to batch, continuous or semicontinuous operation.

According to a preferred embodiment, an aqueous strong base is employed. Typical strong bases within the purview of the instant discovery are the alkali metal hydroxides, the alkaline earth metal hydroxides, such as sodium, potassium and lithium hydroxide as well as calcium and barium hydroxides and equivalents thereof. If desired, the reaction is conducted in the presence of a solvent. Typical inert solvents are: dioxane, diethoxyethane, diethylether or diethylene glycol, tetrahydrofuran, and the like, dimethylformamide, dimethylsulfoxide and pyridine.

The present invention will best be understood from the following examples which are to be taken as merely illustrative and not by way of limitation.

*Example 1.—Preparation of tris[2(4,6-diamino-s-triazinylethyl)]phosphine*

Tris(2-cyanoethyl)phosphine (38.6 grams, 0.2 mole), dicyandiamide (56.0 grams, 0.66 mole) and powdered potassium hydroxide (3.4 grams, 0.06 mole) are mixed with 150 milliliters of ethyl cellosolve and refluxed for four hours. The gray solid which precipitates during this time is collected on a Buchner funnel and washed with ethyl cellosolve. After drying in a vacuum desiccator, it is purified by digestion with 2 N hydrochloric and followed by filtration and then reprecipitation with 2 N sodium hydroxide. The product, tris[2(4,6-diamino-s-triazinylethyl)]phosphine, weighs 65 grams and has a melting point of 302-303° C. *Analysis.*—Calculated for $C_{15}H_{24}N_{15}P$ is 6.95 percent P and 6.56 percent P is found.

*Example 2.—Preparation of tris[2(4,6-diamino-s-triazinylethyl)]-phosphine oxide*

Tris(2-cyanoethyl)phosphine oxide (20.9 grams, 0.1 mole) is reacted with dicyandiamide (27.8 grams, 0.33 mole), potassium hydroxide (1.7 grams, 0.03 mole) and 150 milliliters of ethyl cellosolve and the resulting product is purified as described in Example 1. Forty-six grams of tris[2(4,6 - diamino - s - triazinylethyl)]phosphine oxide is obtained having a melting point greater than 300°

C. *Analysis.*—Calculated for $C_{15}H_{24}N_{15}PO$ is 6.71 percent P and 6.80 percent P is found.

*Example 3.—Preparation of mono[2(4,6-diamino-s-triazinylethyl)]phosphine*

Dicyandiamide (18.5 grams, 0.22 mole) and 1.12 grams (0.02 mole) of potassium hydroxide are mixed with 50 milliliters of ethyl cellosolve. Mono(2-cyanoethyl)phosphine (17.4 grams, 0.2 mole) is mixed with 50 additional milliliters of ethyl cellosolve and added under nitrogen to the other reactants at room temperature. The mixture is refluxed for four hours and at the end of this time one-half (50 milliliters) of the original quantity of cellosolve is stripped. The crystalline solid which separates upon cooling is collected, dried, and recrystallized under nitrogen from methanol. The product, mono[2(4,6-diamino-s-triazinylethyl)]phosphine, weighs 29.5 grams and melts at 164–166° C. It is stable in air and oxidizes only when refluxed in air in high boiling solvents, such as ethyl cellosolve and water. *Analysis.*—Calculated for $C_5H_{10}N_5PO_2$ is C, 29.57 percent and H, 4.96 percent; and found is C, 29.31 percent and H, 4.96 percent.

*Example 4.—Preparation of bis[2(4,6-diaminotriazinylethyl)]phosphine*

A mixture of 28 grams (0.20 mole) of bis(2-cyanoethyl)phosphine, 37.4 grams (0.44 mole) of dicyandiamide, 2.4 grams (0.04 mole) of powdered potassium hydroxide and 100 milliliters of ethyl cellosolve is heated to reflux at 135° C. At this temperature everything is in solution. After refluxing for one hour, a gray, finely divided solid begins to form. The solution is refluxed for a total of four hours and cooled. and the solid separates and dries to give 38 grams (62%) of the crude product, melting point 195–200° C. The product is insoluble in most common organic solvents. It is purified by solution in hot 2 N hydrochloric acid, cooling, separating the hydrochloride (melting point 172–180° C.), redissolving it in water and adding 2 N ammonium hydroxide until a precipitate appears. A good yield of bis[2(4,6-diaminotriazinylethyl)]phosphine having a melting point of 203–210° C. (thick yellow melt) is obtained.

*Example 5.—Preparation of tris[2(4,6-diaminotriazinylethyl)]phosphine oxide-formaldehyde reaction product*

To a suitable vessel is added 150 grams of the phosphine oxide as prepared in Example 2 above, 29.4 grams of formaldehyde and 500 milliliters of water. The mixture is refluxed for approximately eight hours at which point neutrality (pH=7) is attained. Resultant solution is next vacuum distilled and dried in a vacuum oven for twelve hours. The resultant yellowish powder amounting to 138 grams is stored in a desiccator before employing the same in both coating and molding compositions.

The methylolated phosphine oxide commenced to soften at a temperature of about 153° C.

The corresponding methylolated phosphine is prepared by methylolating tris[2(4,6 - diamino-s-triazinylethyl)]phosphine by following the procedure set forth above.

I claim:
1. A phosphine selected from the group consisting of:

(I)
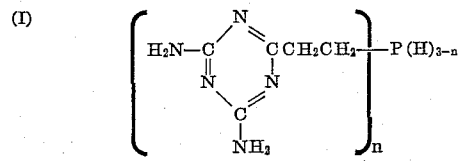

wherein *n* is an integer from 1 to 3, inclusive, and (II)
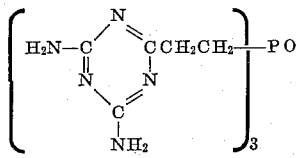

2. Tris[2(4,6-diamino-s-triazinylethyl)]phosphine.
3. Tris[2(4,6 - diamino - s - triazinylethyl)]phosphine oxide.
4. Mono[2(4,6-diamino-s-triazinylethyl)]phosphine.
5. Bis[2(4,6-diamino-s-triazinylethyl)]phosphine.
6. A method of preparing an organic phosphine of the formula:

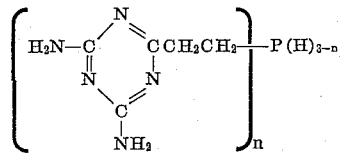

wherein *n* is an integer from 1 to 3, inclusive, in which a 2-cyanoethylphosphine of the formula

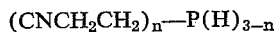

wherein *n* is the same as above, is reacted with dicyandiamide in the presence of alkali, and recovering the corresponding phosphine product.

7. A method of preparing an organic phosphine oxide of the formula:

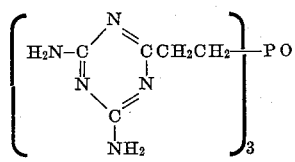

in which tris(2-cyanoethyl)phosphine oxide is reacted with dicyandiamide in the presence of an alkali, and recovering the corresponding phosphine oxide product.

8. A methylolated resin prepared by reacting formaldehyde with a phosphine selected from the group consisting of:

(I)
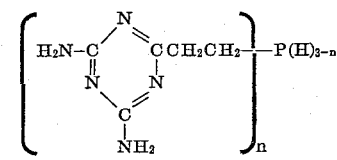

wherein *n* is an integer from 1 to 3, inclusive, and (II)
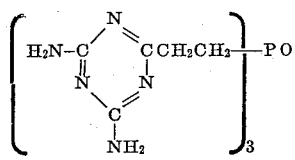

9. Methylolated tris[2(4,6 - diamino-s-triazinylethyl)] phosphine.
10. Methylolated tris[2(4,6-diamino-s-triazinylethyl)] phosphine oxide.

References Cited

UNITED STATES PATENTS 3,305,436  2/1967  Wohnsiedler ____ 260—249.9 X

NORMA S. MILESTONE, *Acting Primary Examiner.*

J. D. RANDOLPH, WALTER A. MODANCE,
*Examiners.*

J. M. FORD, *Assistant Examiner.*